J. R. HARRISON.
THRESHER RACK.
APPLICATION FILED OCT. 10, 1910.
999,716.
Patented Aug. 1, 1911.
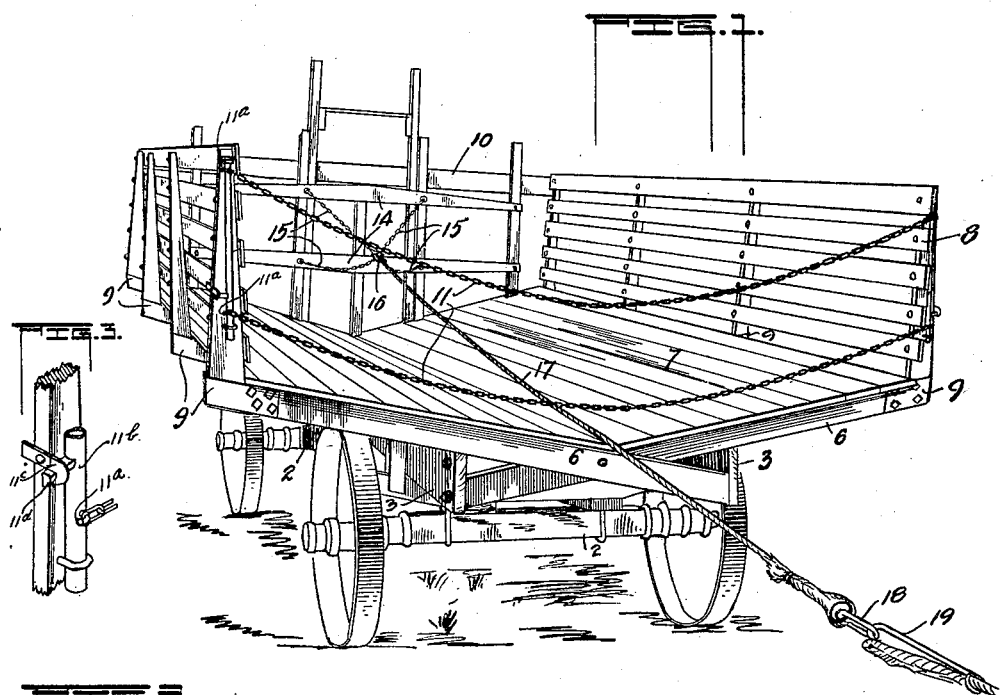
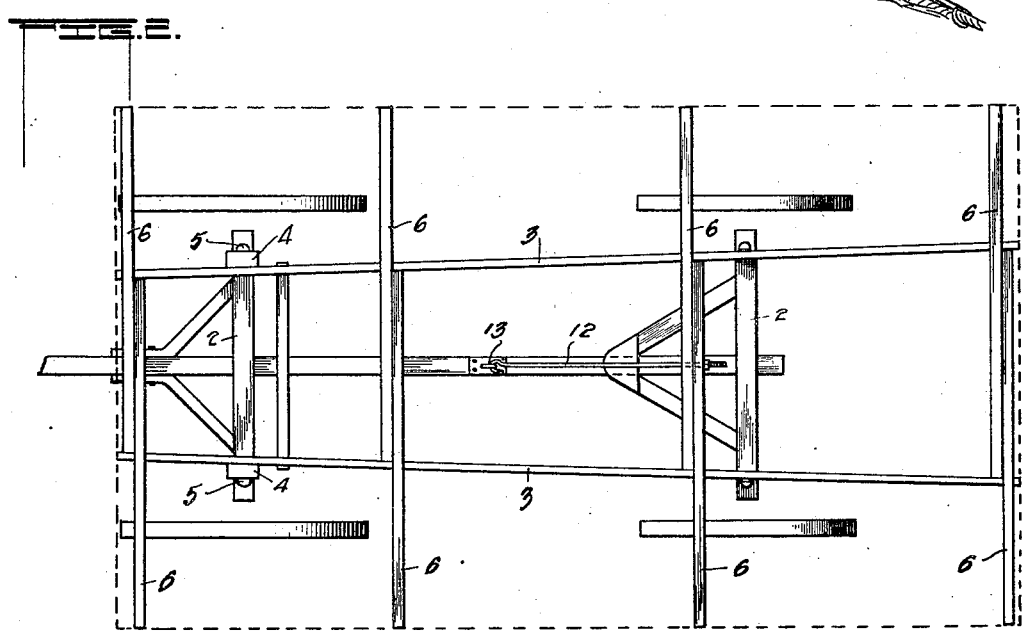
WITNESSES
INVENTOR
James R. Harrison
By
W. V. Tifft ATT'Y.

UNITED STATES PATENT OFFICE.

JAMES R. HARRISON, OF PEORIA, ILLINOIS.

THRESHER-RACK.

999,716.　　　Specification of Letters Patent.　　Patented Aug. 1, 1911.

Application filed October 10, 1910. Serial No. 586,151.

*To all whom it may concern:*

Be it known that I, JAMES R. HARRISON, a citizen of the United States of America, residing at Peoria, in the county of Peoria and State of Illinois, have invented certain new and useful Improvements in Thresher-Racks, of which the following is a specification.

My invention relates to a thresher rack.

The object of my invention is to provide an easy, quick and effective means for unloading unthreshed or other loads of grain, as wheat and oats, and to reduce the units of labor ordinarily attending particularly the delivery of grain to a thresher, and incidentally to reduce the cost of handling the grain.

My invention consists particularly of a barge like receptacle adapted for transportation in the same manner as the ordinary hay rack and is disposed at a rearward incline; a movable frame disposed vertically within the receptacle and provided with means for attachment of a rope or chain adapted to be anchored to a point rearward of the receptacle.

My invention also consists in the combination of certain structural parts in a relation to produce an organization which in its entirety is best fitted to accomplish the object sought and to reduce cost to the minimum.

Referring to the drawings,—Figure 1 is a perspective view showing the form and structural combination of my invention, the parts in the proper organized relation to cause the load to be withdrawn from the receptacle, but the load is omitted for the purposes of the illustration; Fig. 2 is a plan view of structural parts of the device mounted upon a truck, and showing diagrammatically the outline of the receptacle body. Fig. 3 is a perspective view of a pivoted chain fastener.

Attending the threshing of grain when the supply is derived from the shocks of bound grain distributed over the fields or from a header or reaper at work simultaneously with the threshing operation, it has been the universal practice to load the bound bundles upon hay racks or the headed grain in barges, the carrying vehicles then being driven to a position adjacent the thresher and there unloaded, bundle by bundle and fork-load after fork-load, only just as fast as the thresher was able to dispose of the waiting load, causing the load transporting conveyance and the team needlessly to be withdrawn from transporting service and causing loaded vehicles, team and man to line up and wait their turn, resulting in a useless waste of labor and time and an unnecessarily added expense.

It is the purpose of my invention to provide means whereby the load may be drawn to the point convenient for delivery to the thresher and to then be withdrawn from the carrying vehicle, permitting it to immediately return to the carrying service and to obviate any and all waits, and leaving the grain upon the ground in the proper place for convenient and gradual delivery to the thresher, and in the charge of a man or men specially selected to perform that branch of the labor attending threshing. To accomplish these advantageous results, I have designed a plan and structure, one form of which is herein illustrated, and in which—

2 refers generally to a wagon truck of the common and standard type; 3 are longitudinal sills preferably disposed slightly at an angle so that the distance between the forward ends thereof is less than at the rear, and for the purpose of providing greater clearance for the front wheels in turning; 4 are blocks secured to the sides of the sills, serving as a filler, between the forward standards 5 and the sills, of the space occasioned by the forward convergence of the sills from the normal wagon body width; 6 are cross sills disposed at an angle relatively to give the desired central pitch or incline as shown, the said sills being properly secured to sills 3 and the adjacent pairs to each other.

7 is the floor or bottom of the receptacle, 8 are slatted side walls rendered detachable by frame parts thereof being removably seated in sockets 9, secured to the outer ends of cross sills 6; 10 is the forward end wall of the receptacle and may be permanently united to the body thereof, and may, if desired, be suitably connected with the upper portion of the side walls 9; 11 are two chains, one end of each being secured to one of the side walls and the other ends adapted to engage hooks 11$^a$ secured to a rod 11$^b$ suitably supported and turned on the side wall and which rod is adapted to be locked by dog 11$^c$, engaging pin 11$^d$ to hold the chains in position to close the end of the receptacle and to be released to free them when the load is to be dumped; 12 is a hooked and threaded rod adapted, the hook thereof to engage an eye 13 secured to the wagon coupler, and the other end being connected and secured to the receptacle body by use of the nut provided. By means of the connection through the rod 12, of the receptacle and the running gear of the wagon, the former is held from being drawn from the latter under the rearward pull attending the removal of the load.

14 is a movable frame or false forward end wall formed in open framework manner as shown, and the lower ends of the vertical frame pieces conforming to the shape of the receptacle floor. The frame is adapted to be set up against the front wall 10, but having no fixed connection with the receptacle; 15 are chains connected with the movable frame in the manner shown and with each other in such relation when drawn forwardly from the connection at 16, that the draft force will be so equally distributed that the frame will maintain substantially the rectangular relation with the body of the receptacle as shown herein, so that an equally distributed force will be applied to the load being withdrawn.

17 is a rope connected at point 16, to chains 15, and is provided at its rear end with an eye or link 18, adapted to engage a fixed object as hook 19.

The operation of the device is of the simplest character. The frame 14, having been placed in the forward end of the receptacle, the vehicle is then loaded and being driven to the unloading place adjacent the thresher, the eye 18 is engaged with the fixed hook 19, the closure chains are unclasped and the horses are started and the vehicle including the receptacle, withdrawn. The frame 14 being held from forward movement, likewise holds the load from movement, thereby permitting the vehicle to move from underneath it, resulting in its deposit upon the ground. The rope 17 is detached from the fixed object, the frame is set up against the front wall of the receptacle, the closure chains reunited and the device is in readiness to receive another load. To give the receptacle the proper rearward incline, the forward and rear wheels are interchanged but the longitudinal sill 3 may be formed with a rearward taper, or the receptacle may be suitably blocked up at its forward end, or both expedients may be resorted to if desired, or any suitable means may be employed to accomplish the desired rearward inclination.

The essence of my invention resides in the adaptability of means to accomplish the quick unloading of grain from vehicles of which I have shown herein one form of embodiment, but other mechanical organizations in many different forms may be made to serve the purpose, and I therefore desire to claim all forms falling within the structural principle herein pointed out.

What I claim is:—

1. In combination, a transportable carrying receptacle, a fixed object external of the carrying receptacle, a frame substantially in form as disclosed in the drawings adapted to stand in the front end of the carrying receptacle while the latter is being loaded, a draft member having a loose joining connection with said frame and passing rearwardly throughout the length of the load carrying portion of the receptacle and adapted to be connected with the fixed external object, whereby the rack may be filled, leaving the rear end of the draft member protruding adapting it to be connected with the external object to facilitate the withdrawal of the load.

2. In combination, a thresher rack body comprising a bottom, sides, a front end wall and rear end closure means, a fixed object external of the rack body, a frame substantially in form as disclosed in the drawings, adapted to stand in the front end of the rack body while the latter is being loaded, and a flexible member as a chain or rope, its forward end connecting with said frame and passing rearwardly throughout the length of the load-carrying portion of the rack and connected with the fixed external object, whereby the rack may be filled, leaving the rear end of the flexible member protruding to be fixed to the external object to facilitate in the withdrawal of the load.

3. In combination with a thresher rack body comprising a bottom, sides and front end walls, and rear closure means and a fixed object external of the rack, a frame adapted to stand in the front end of the rack body while the latter is being loaded, a plurality of chains or the like connected with the frame and converging to a central uniting point and a flexible member united at the connecting point with said chains extending through and lengthwise of the load carrying portion of the rack and connecting with the external fixed object, whereby the movement of the rack from the fixed object would cause the load to be withdrawn from the rack.

In testimony whereof I have affixed my signature in presence of two witnesses.

JAMES R. HARRISON.

Witnesses:
 MARY E. COMEGYS,
 W. V. TEFFT.

---

Copies of this patent may be obtained for five cents each, by addressing the " Commissioner of Patents, Washington, D. C."